United States Patent
Agarwal et al.

(10) Patent No.: US 9,378,151 B2
(45) Date of Patent: Jun. 28, 2016

(54) SYSTEM AND METHOD OF HINTED CACHE DATA REMOVAL

(71) Applicant: LSI Corporation, San Jose, CA (US)

(72) Inventors: Vineet Agarwal, Kanpur (IN); Durga Prasad Bhattarai, Bangalore (IN); Sourav Saha, Bangalore (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 400 days.

(21) Appl. No.: 14/018,100

(22) Filed: Sep. 4, 2013

(65) Prior Publication Data

US 2015/0039835 A1 Feb. 5, 2015

(30) Foreign Application Priority Data

Aug. 5, 2013 (IN) .............................. 926/KOL/2013

(51) Int. Cl.
*G06F 12/00* (2006.01)
*G06F 12/12* (2016.01)
*G06F 12/08* (2016.01)

(52) U.S. Cl.
CPC .......... *G06F 12/121* (2013.01); *G06F 12/0804* (2013.01)

(58) Field of Classification Search
USPC ....................................................... 711/133
See application file for complete search history.

(56) References Cited

U.S. PATENT DOCUMENTS

| 7,636,801 | B1 | | 12/2009 | Kekre et al. | |
|---|---|---|---|---|---|
| 8,635,410 | B1 | * | 1/2014 | Kuskin | G06F 12/0891 711/119 |
| 2007/0067574 | A1 | * | 3/2007 | Stempel | G06F 12/126 711/129 |
| 2012/0117328 | A1 | * | 5/2012 | McKean | G06F 12/0866 711/136 |

FOREIGN PATENT DOCUMENTS

EP 463874 A2 1/1992

* cited by examiner

*Primary Examiner* — Matthew Bradley

(57) ABSTRACT

The disclosure is directed to a system and method of cache management for a data storage system. According to various embodiments, the cache management system includes a hinting driver, a priority controller, and a data scrubber. The hinting driver generates pointers based upon data packets intercepted from data transfer requests being processed by a host controller of the data storage system. The priority controller determines whether the data transfer request includes a request to discard a portion of data based upon the pointers generated by the hinting driver. If the priority controller determines that data transfer request includes a request to discard a portion of data, the data scrubber locates and removes the portion of data from the cache memory so that the cache memory is freed from invalid data (e.g. data associated with a deleted file).

20 Claims, 5 Drawing Sheets

SYSTEM AND METHOD OF HINTED CACHE DATA REMOVAL

PRIORITY

The present application claims priority under 35 U.S.C. 119(b) to Indian Patent Application Serial No. 926/KOL/2013, entitled SYSTEM AND METHOD OF HINTED CACHE DATA REMOVAL, By Vineet Agarwal et al., filed Aug. 5, 2013, which is currently co-pending, or is an application of which a currently co-pending application is entitled to the benefit of the filing date.

FIELD OF INVENTION

The disclosure relates to the field of cache management for data storage systems.

BACKGROUND

Data storage systems often include cache memory for storing most frequently used data, also known as data "hot spots." Typically the cache memory is stored on high speed storage media, such as a flash drive or a solid state disk, for improved accessibility. In many systems, the storage and removal of data from cache memory is based upon a priority queue where data priority is determined according to data transfer activity. For example, data may be deemed "hot" if it receives specified number of I/O hits over a certain time interval. When cache memory is substantially filled or at a critical size, the addition of new cache data results in removal of previously cached data residing at a lower priority tier. In some instances, invalid data that is associated with non-existent or corrupt files (e.g. deleted files) may persist in cache memory until the invalid data is replaced by higher priority data.

SUMMARY

Various embodiments of the disclosure are directed to a cache management system including at least a hinting driver, a priority controller, and a data scrubber. The hinting driver is configured to intercept data packets from at least one data transfer request being processed by a host controller in communication with one or more storage devices. The hinting driver is further configured to generate pointers based upon the intercepted data packets. The priority controller is configured to receive the pointers generated by the hinting driver. Based upon the pointers, the priority controller is enabled to determine whether the data transfer request includes a request to discard a portion of data. The data scrubber is configured to locate and remove the portion of data from the cache memory when the priority controller determines that the data transfer request includes a request to discard the portion of data. Accordingly, the cache memory is freed from invalid data (e.g. data associated with a deleted file).

It is to be understood that both the foregoing general description and the following detailed description are not necessarily restrictive of the disclosure. The accompanying drawings, which are incorporated in and constitute a part of the specification, illustrate embodiments of the disclosure.

BRIEF DESCRIPTION OF THE DRAWINGS

The embodiments of the disclosure may be better understood by those skilled in the art by reference to the accompanying figures in which.

DETAILED DESCRIPTION

Reference will now be made in detail to the embodiments disclosed, which are illustrated in the accompanying drawings.

FIGS. 1A through 3 illustrate embodiments of a system and method directed to managing cache memory for a data storage system. In some cache management architectures, such as in NYTRO MEGARAID systems, data is cached on high speed media, such as NYTRO flash drives. The high speed media storing the cache memory is divided into a plurality of cache data windows of a selected size, such as 1 Mb each. Caching of data is based upon a most frequently used (MFU) algorithm or a hot spot detection algorithm. Similarly, the removal of data from cache memory is based upon a least recently used (LRU) algorithm.

Reference to any of the MFU, LRU, and hot spot detection algorithms generally defines a priority queue where "hot" data is stored in cache memory when a specified threshold of data transfer activity or heat quotient is achieved. In some embodiments, the threshold level of data transfer activity is satisfied upon receipt of at least three data transfer requests (or "I/O hits"). If no free data windows are available to receive the hot data, then data residing at a low priority tier is removed from cache memory. The data windows freed as a result of removing the cold data from cache memory are then used to cache the hot data.

In some embodiments, data packets associated with a data transfer request are priority-hinted utilizing pointers to enable caching at a selected priority tier, such as the highest priority tier, upon satisfying the threshold heat quotient. Placing hot data at a higher tier of the priority queue allows the hot data to remain in cache memory for a longer period of time despite a potential decrease in data transfer activity. However, data at a high priority tier may become invalid, for example, when a file associated with the data is deleted from the system. According to the LRU algorithm, data will persist in cache memory until it is gradually flushed from the priority queue by higher priority data. Data windows in the cache memory may be unnecessarily occupied with the invalid data as a result. Furthermore, valid data residing at a lower priority tier may be flushed while the invalid data persists if the invalid data is at a higher tier of the priority queue.

Figure 1A:
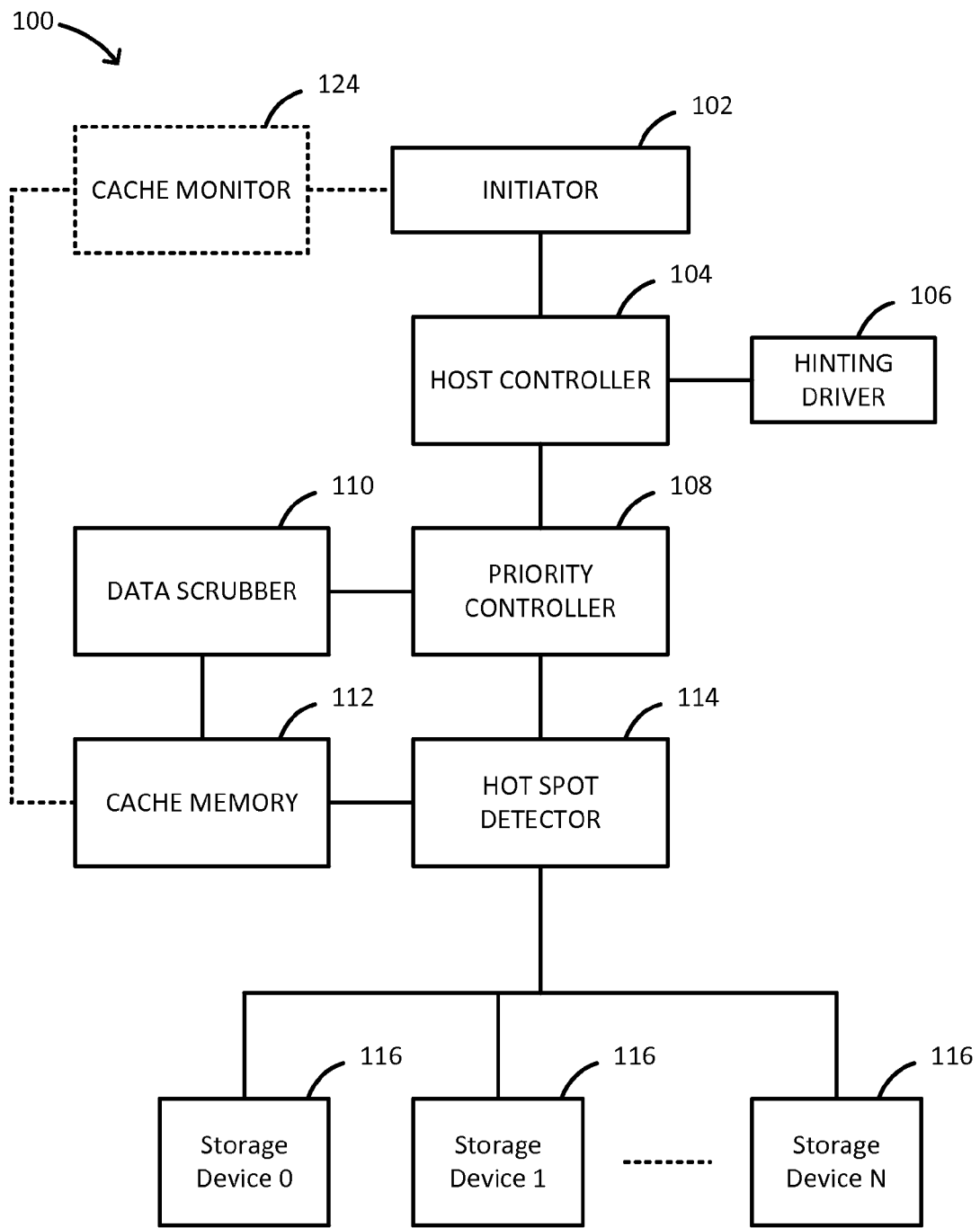
FIG. 1A is a block diagram illustrating cache management architecture within a data storage system, in accordance with an embodiment of the disclosure.
Figure 1B:
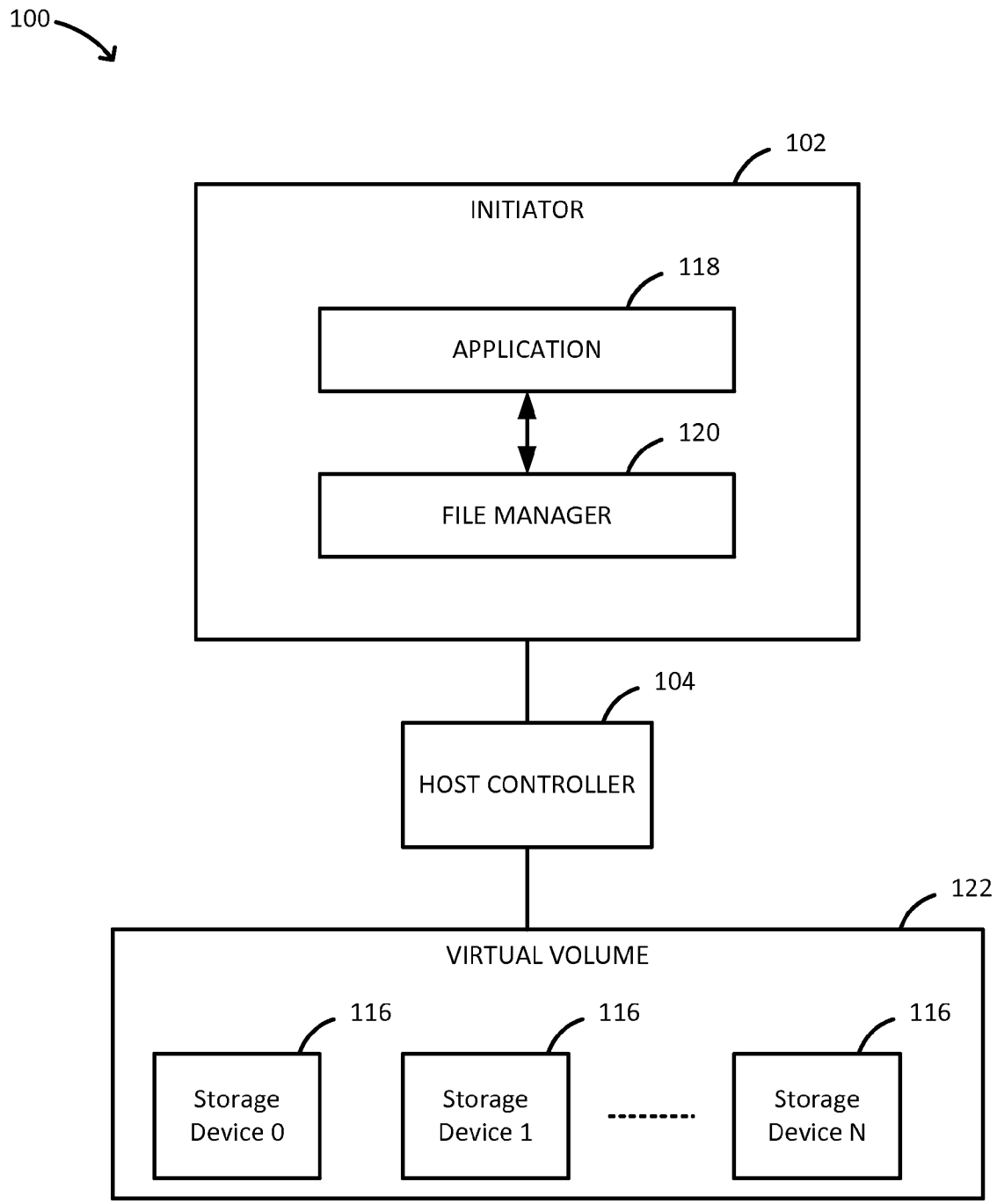
FIG. 1B is a block diagram illustrating the file system layer of a data storage system, in accordance with an embodiment of the disclosure.
Figure 1C:
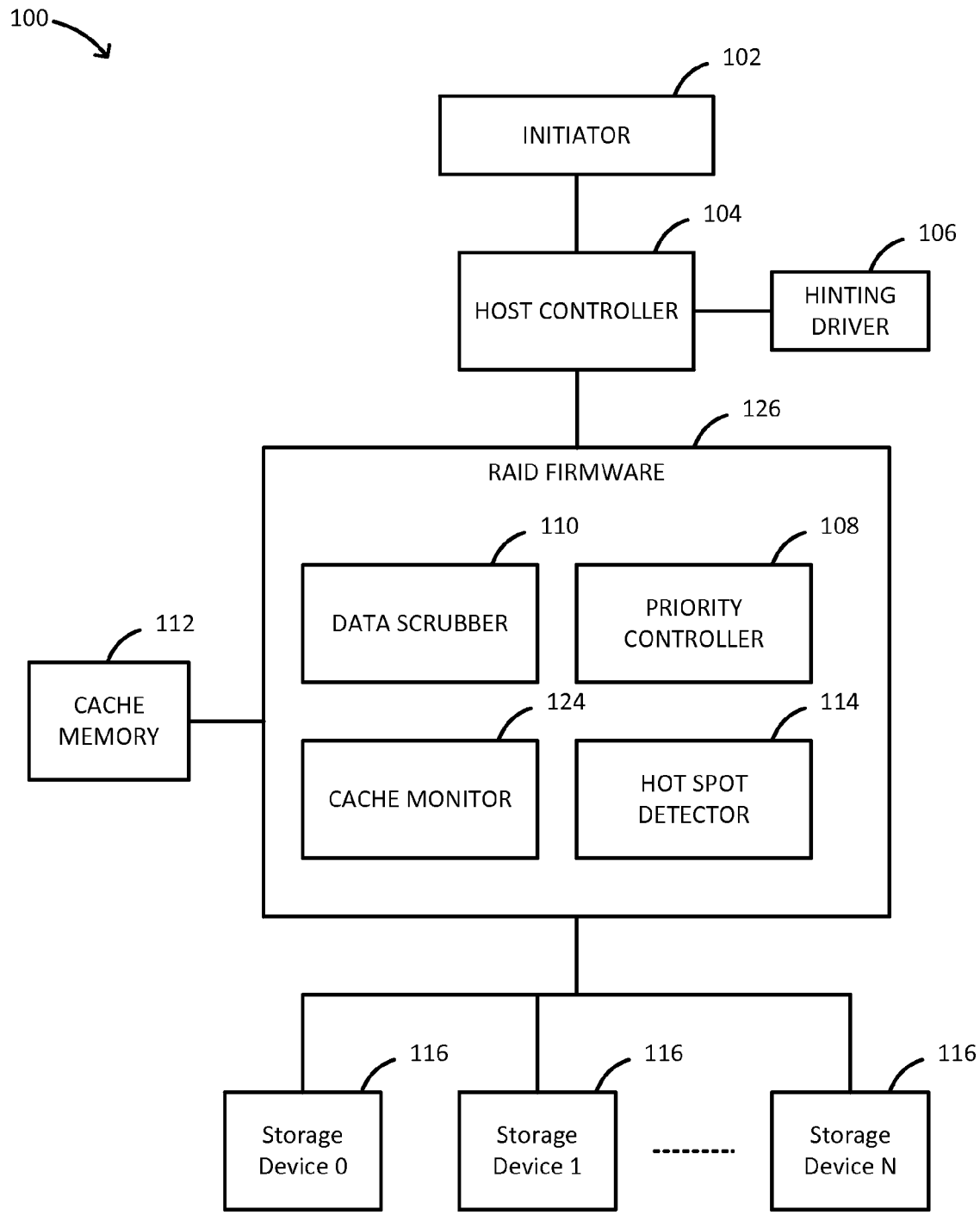
FIG. 1C is a block diagram illustrating cache management architecture within a data storage system, where at least a portion of the cache management architecture is defined by firmware, in accordance with an embodiment of the disclosure.

FIGS. 1A through 1C illustrate cache management architecture for a data storage system 100 enabling removal of data from cache memory when it becomes invalid, such as when a file associated with the cache data is deleted. Accordingly, invalid data is removed from the cache memory regardless of whether or not the LRU algorithm is satisfied. Overall system performance is improved because invalid data will not occupy data windows in cache memory that should be allocated to valid data.

In an embodiment, as shown in FIG. 1A, the data storage system 100 includes at least one initiator 102 configured to provide data transfer requests to a host controller 104 for execution. In some embodiments, as shown in FIG. 1B, the initiator 102 includes an application module 118 in communication with a file manager 120. The host controller 104 is configured to process a data transfer request (e.g. file creation, deletion, alteration, or migration by an application 118 via the file manager 120) by transferring data to or from one or more communicatively coupled storage devices 116, such as hard disk drives. In some embodiments, multiple storage devices 116 are configured to function as a virtual volume 122 accessible via the host controller 104 as a single (virtual) drive. In some embodiments, the storage devices 116 are configured according to a redundant array of independent disks (RAID) architecture, such as NYTRO MEGARAID (NMR) architecture developed by LSI Corporation.

Referring again to FIG. 1A, the system 100 further includes a hinting driver 106 in communication with the host controller 104. The hinting driver 106 is configured to receive data packets associated with the data transfer request being processed by the host controller 104. The hinting driver 106 is further configured to generate pointers (e.g. data structures referencing addressable portions of storage memory) based upon the intercepted data packets. The system 100 further includes a priority controller 108 configured to receive the pointers generated by the hinting driver 106. The hinting driver 106 is configured to directly or indirectly (e.g. via the host controller 104) transfer the pointers to the priority controller 108. In some embodiments, the host controller 104 is configured to merge the pointers with the data packets of the data transfer request and send the merged pointers and data packets to the priority controller 108 for processing.

The priority controller 108 is configured to decode the pointers to determine whether or not the data transfer request being processed by the host controller 104 includes a request to discard a portion of data, such as when the initiator 102 generates a request for deletion of a file or fragment from the virtual volume 122. For example, the priority controller 108 may be configured to determine that the data transfer request includes a request to discard a portion of data based upon at least one memory address being referenced by at least one of the pointers. When it is determined that the data transfer request includes a request to discard a portion of data, the priority controller 108 is further configured to transfer the request to discard the portion of data to a data scrubber 110.

The system further includes a cache memory 112 in direct or indirect (e.g. via a data scrubber 110 or a hot spot detector 114) communication with the priority controller 108. In some embodiments, the cache memory 112 is stored by higher performance media (e.g. one or more flash drives or solid-state disk drives) than the one or more storage devices 116 (e.g. hard disk drives) that define the virtual volume 122. Based upon the request received from the priority controller 108, the data scrubber 110 is configured to search a cache memory 112 to locate the portion of data associated with the discard request. For example, the data scrubber 110 may be configured to determine whether data is cached at a logical block address range indicated by the request to discard the portion of data.

If the portion of data is cached, and hence located in cache memory 112, the data scrubber 110 is configured to remove the (invalid) portion of data from the cache memory 112. In some embodiments, the data scrubber 110 is configured to clear data windows bearing the invalid cache data. In some embodiments, the data scrubber 110 is additionally or alternatively configured to designate the data windows including the logical block address range of the discard request as free data windows, the free data windows then being available for storage of valid cache data.

In some embodiments, the system 100 further includes a cache monitor 124 in communication with the cache memory 112. The cache monitor 124 is configured to determine an availability of free data windows in the cache memory 114. In some embodiments, the cache monitor 124 is configured to poll the cache memory 112 periodically or at specified times to check the cache availability. The cache monitor 124 is further configured to prompt the initiator 102 when the cache availability (i.e. free data windows) drops below a specified threshold. In response to receiving a prompt from the cache monitor 124, the initiator 102 is configured to scan the virtual volume 122 for unused portions of data, such as temporary, corrupt, invalid, or stale files or fragments. The initiator 102 is further configured to delete the unused portions of data, thereby triggering a data transfer request inclusive of a request to discard a respective portion of data. In accordance with the foregoing embodiments, corresponding cache data is removed from the cache memory 112. This monitoring and management of the cache memory 112 maintains an availability of free cache data windows and frees the cache memory 112 from unused or invalid data.

According to various embodiments, the initiator 102, host controller 104, hinting driver 106, priority controller 108, data scrubber 110, hot spot detector 114, and cache monitor 124 include any combination of hardware, software, and firmware configured to perform the respective functions or steps described herein. In some embodiments, one or more of the functions or steps are performed by at least one processor according to program instructions executed from communicatively coupled carrier media. In some embodiments, one or more of the functions or steps are performed by one or more dedicated hardware or firmware controllers. For example, as shown in FIG. 1C, various functions of the priority controller 108, the data scrubber 110, the hot spot detector 114, and the cache monitor 124 may be carried out via RAID firmware, such as NMR firmware or the like.

Figure 2:
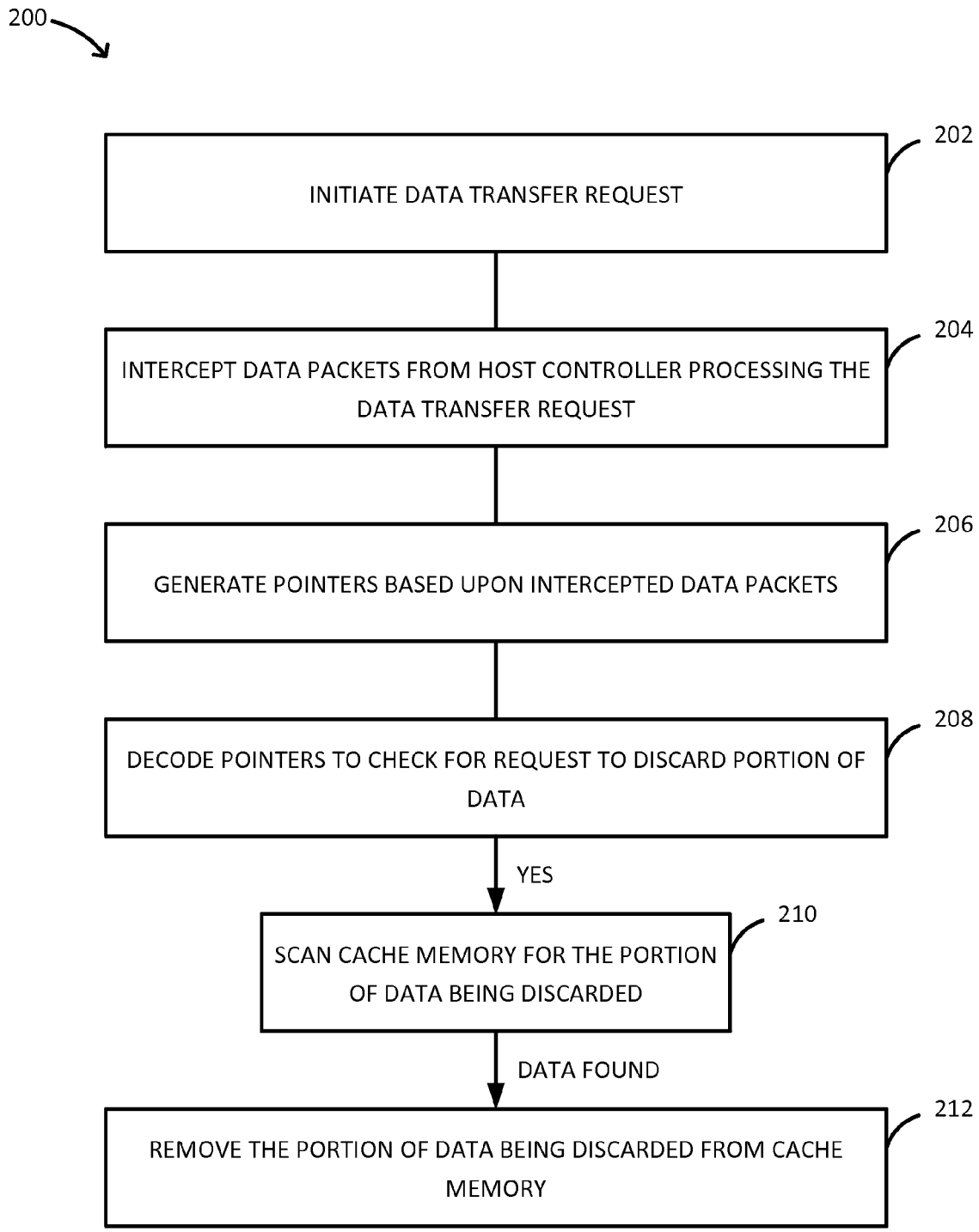
FIG. 2 is a flow diagram illustrating a method of removing data associated with discarded files from cache memory, in accordance with an embodiment of the disclosure.
Figure 3:
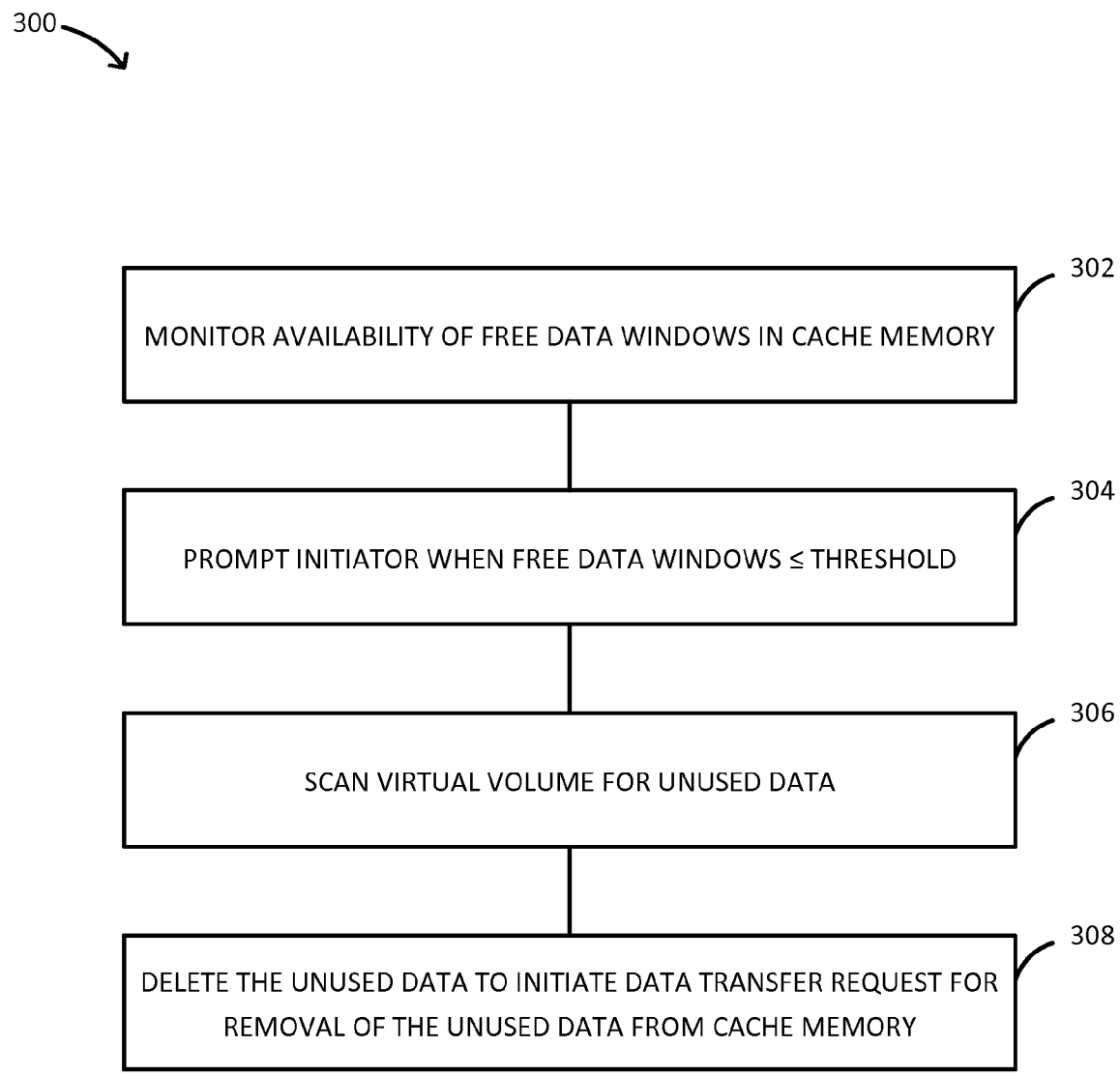
FIG. 3 is a flow diagram illustrating a method of maintaining free data windows in cache memory, in accordance with an embodiment of the disclosure.

FIGS. 2 and 3 illustrate embodiments of a method 200 of managing cache memory for a data storage system and a method 300 of monitoring cache memory for a data storage system. In some embodiments, methods 200 and 300 are manifested by the cache management architecture described in embodiments of system 100. As such, methods 200 and 300 may include a step for carrying out any feature or function described with regards to embodiments of system 100. It is noted, however, that the embodiments of system 100 described herein are not intended to limit methods 200 and 300. Unless otherwise noted, method 200 and method 300 should be understood to encompass any system or device configured to execute one or more of the respective steps that follow.

With reference to FIG. 2, method 200 is directed to removing invalid or unused data from a cache memory 112 based upon a hinted data transfer request. At step 202, a data transfer request is initiated by an initiator 102, such as an application 118 accessing a file manager 120 at the file system layer. In some embodiments, the data transfer request is generated in response to the application 118 creating, deleting, altering, or migrating a file via the file manager 120. The resulting data transfer request is sent for execution to a host controller 104 in communication with one or more storage devices 116. In some embodiments, the one or more storage devices 116 define a virtual volume 122 accessible by the file manager 120 via the host controller 104.

At step 204, a hinting driver 106 in communication with the host controller 104 intercepts data packets associated with the data transfer request being processed. At step 206, the hinting driver 106 generates pointers based upon the intercepted data packets. In some embodiments, the pointers include data structures referencing addressable portions of a storage memory. When the data transfer request includes a discard flag, the pointers may further include information associated with the request to discard a portion of data. In some embodiments, the hinting driver 106 sends the pointers to the host controller 104 for transmission to a priority controller 108.

At step 208, the priority controller 108 decodes the pointers received directly or indirectly (via the host controller 104) from the hinting driver 106. In some embodiments, the priority controller 108 receives the pointers merged with the data packets from the host controller 104. Based upon the pointers, the priority controller 108 determines whether or not the data transfer request includes a request to discard a portion of data. When the priority controller 108 determines that a request to discard a portion of data is included, the discard request is transferred to a data scrubber 110, whereupon the method 200 proceeds to step 210.

At steps 210 and 212, the data scrubber 110 locates and removes the portion of data (if found) from the cache memory 112. The data scrubber 110 scans the cache memory 112 to determine if the portion of data is cached. If the portion of data is cached, the data scrubber 110 clears the portion of data from the cache memory 112 and/or designates data windows (formerly or currently) bearing the portion of data as free data windows. If the portion of data is not found in the cache memory 112, the request to discard the portion of data is disregarded. In some embodiments, locating the portion of data includes determining whether data is cached for logical block addresses included in the discard request or referenced by the pointers. In some embodiments, removing the invalid data from the cache memory 112 includes designating data windows including the respective logical block address range as free data windows, the free data windows being available to receive subsequently cached data.

With reference to FIG. 3, method 300 is directed to monitoring an availability of the cache memory 112 and initiating removal of invalid cache data when the availability is below a specified threshold. At step 302, a cache monitor 124 polls the cache memory 112 periodically or at specified times to determine the availability of free data windows or occupancy of the cache memory 112. When the availability of free data windows is determined to be below the threshold availability, the method proceeds to step 304. At step 304, the initiator 102 is prompted to scan for unused data, such as temporary, corrupt, invalid, or stale files or fragments that can be deleted. At step 306, the initiator 102 scans the one or more storage devices 116 or a virtual volume 122 defined by the storage devices 116 to locate any unused portions of data. At step 308, the unused portions of data are deleted, thereby initiating method 200 of removing cache data associated with the discarded portions of data. The availability of the cache memory 112 is improved as a result of removing invalid or unused data.

It should be recognized that the various functions or steps described throughout the present disclosure may be carried out by any combination of hardware, software, or firmware. In some embodiments, various steps or functions are carried out by one or more of the following: electronic circuits, logic gates, field programmable gate arrays, multiplexers, or computing systems. A computing system may include, but is not limited to, a personal computing system, mainframe computing system, workstation, image computer, parallel processor, or any other device known in the art. In general, the term "computing system" is broadly defined to encompass any device having one or more processors, which execute instructions from a memory medium.

Program instructions implementing methods, such as those manifested by embodiments described herein, may be transmitted over or stored on carrier medium. The carrier medium may be a transmission medium, such as, but not limited to, a wire, cable, or wireless transmission link. The carrier medium may also include a storage medium such as, but not limited to, a read-only memory, a random access memory, a magnetic or optical disk, or a magnetic tape.

It is further contemplated that any embodiment of the disclosure manifested above as a system or method may include at least a portion of any other embodiment described herein. Those having skill in the art will appreciate that there are various embodiments by which systems and methods described herein can be effected, and that the implementation will vary with the context in which an embodiment of the disclosure deployed.

Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A system for cache management, comprising:
   a hinting driver configured to receive data packets of a data transfer request being processed by a host controller in communication with one or more storage devices, and further configured to generate pointers based upon the data packets;
   a priority controller configured to receive the pointers generated by the hinting driver, and further configured to determine, based upon the pointers, whether the data transfer request includes a request to discard a portion of data from a cache memory; and
   a data scrubber configured to remove the portion of data from the cache memory when the data transfer request includes the request to discard the portion of data, wherein the data scrubber configured to remove the portion of data from the cache memory bypasses a priority queue data removal procedure.

2. The system of claim 1, wherein the hinting driver is further configured to send the pointers to the host controller, and wherein the priority controller is configured to receive the pointers from the host controller.

3. The system of claim 2, wherein the priority controller is further configured to receive the data packets merged with the pointers from the host controller.

4. The system of claim 1, wherein the priority controller is further configured to send the request to discard the portion of data to the data scrubber.

5. The system of claim 1, wherein the data scrubber is configured to determine whether the portion of data is stored at a logical block address range indicated by the request to discard the portion of data.

6. The system of claim 5, wherein the data scrubber is further configured to designate free data windows of the cache memory including the logical block address range indicated by the request to discard the portion of data.

7. A data storage system, comprising:
   a host controller in communication with one or more storage devices, the host controller configured to process a data transfer request based upon data being deleted by an initiator from a virtual volume defined by the one or more storage devices;

a hinting driver configured to receive data packets of the data transfer request being processed by the host controller, and further configured to generate pointers based upon the data packets;

a priority controller configured to receive the pointers generated by the hinting driver, and further configured to determine, based upon the pointers, whether the data transfer request includes a request to discard a portion of data from a cache memory; and a data scrubber configured to remove the portion of data from the cache memory when the data transfer request includes the request to discard the portion of data, wherein the data scrubber configured to remove the portion of data from the cache memory bypasses a priority queue data removal procedure.

8. The system of claim 7, further comprising:

a cache monitor configured to determine an availability of free data windows in the cache memory, and further configured to prompt the initiator when the availability of free data windows is below a threshold availability.

9. The system of claim 8, wherein the initiator, in response to being prompted, is configured to scan the virtual volume for unused data, and further configured to delete the unused data from the virtual volume.

10. The system of claim 7, wherein the hinting driver is further configured to send the pointers to the host controller, and wherein the priority controller is configured to receive the pointers from the host controller.

11. The system of claim 10, wherein the priority controller is further configured to receive the data packets merged with the pointers from the host controller.

12. The system of claim 7, wherein the priority controller is further configured to send the request to discard the portion of data to the data scrubber.

13. The system of claim 7, wherein the data scrubber is configured to determine whether the portion of data is stored at a logical block address range indicated by the request to discard the portion of data.

14. The system of claim 13, wherein the data scrubber is further configured to designate free data windows of the cache memory including the logical block address range indicated by the request to discard the portion of data.

15. A method of cache management, comprising:

generating pointers based upon data packets of a data transfer request being processed by a host controller in communication with one or more storage devices, the data transfer request being based upon deletion of data by an initiator from a virtual volume defined by the one or more storage devices;

determining, based upon the pointers, whether the data transfer request includes a request to discard a portion of data from a cache memory; and removing the portion of data from the cache memory when the data transfer request includes the request to discard the portion of data, wherein the removing the portion of data from the cache memory bypasses a priority queue data removal procedure.

16. The method of claim 15, further comprising:

monitoring an availability of free data windows in the cache memory; and prompting the initiator when the availability of free data windows is below a threshold availability.

17. The method of claim 16, further comprising:

scanning the virtual volume for unused data when the availability of free data windows in the cache memory is below the threshold availability; and deleting the unused data from the virtual volume via the initiator.

18. The method of claim 15, further comprising:

sending the pointers from a hinting driver to the host controller;

merging the data packets with the pointers via the host controller; and sending the data packets merged with the pointers from the host controller to a priority controller.

19. The method of claim 15, further comprising:

determining whether the portion of data is stored at a logical block address range indicated by the request to discard the portion of data.

20. The method of claim 19, further comprising:

designating free data windows of the cache memory including the logical block address range indicated by the request to discard the portion of data.

* * * * *